(12) United States Patent
Lauffer et al.

(10) Patent No.: US 10,549,731 B2
(45) Date of Patent: Feb. 4, 2020

(54) ELECTRIC PARKING BRAKE FOR AUTONOMOUS VEHICLES

(71) Applicant: Ford Global Technologies, LLC, Dearborn, MI (US)

(72) Inventors: Scott J. Lauffer, Northville, MI (US); John P. Joyce, West Bloomfield, MI (US); Daniel A. Gabor, Canton, MI (US); Samer Abbas, Dearborn, MI (US); Steven R. El Aile, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 245 days.

(21) Appl. No.: 15/210,739

(22) Filed: Jul. 14, 2016

(65) Prior Publication Data

US 2017/0166173 A1 Jun. 15, 2017

Related U.S. Application Data

(60) Provisional application No. 62/265,915, filed on Dec. 10, 2015.

(51) Int. Cl.
*B60T 8/17* (2006.01)
*B60T 8/172* (2006.01)

(52) U.S. Cl.
CPC ............ *B60T 8/17* (2013.01); *B60T 8/172* (2013.01); *B60T 2270/402* (2013.01); *B60T 2270/414* (2013.01)

(58) Field of Classification Search
CPC ...... B60T 8/17; B60T 8/172; B60T 2270/402; B60T 2270/414; B60T 13/662; B60T 7/12; B60T 8/885

(Continued)

(56) References Cited

U.S. PATENT DOCUMENTS 5,957,551 A * 9/1999 Maron .............. B60T 1/10
303/15
5,961,190 A * 10/1999 Brandmeier ........... B60T 7/042
188/159

(Continued)

FOREIGN PATENT DOCUMENTS

DE 19758289 A1 * 7/1999 ............ B60T 13/74
DE 19758289 A1 7/1999

(Continued)

OTHER PUBLICATIONS

Machine Translation in English for JP 11-171006-A ; Inventor Nakamura et al.; 6 pages; Retreive Date: Nov. 1, 2017.*

(Continued)

*Primary Examiner* — Nicholas J Lane
(74) *Attorney, Agent, or Firm* — Frank A. MacKenzie; Bejin Bieneman PLC

(57) ABSTRACT

A vehicle parking brake system includes a power bridge. The power bridge is electrically connected to a primary power source and to a secondary power source. The power bridge has a first condition in which the primary power source is active in which the primary source is electrically connected to a parking brake actuator. The power bridge has a second condition in which the primary power source is not active in which the secondary power source is electrically connected to the parking brake.

17 Claims, 2 Drawing Sheets

(58) Field of Classification Search
USPC .................................... 303/2, 15, 20, 152
See application file for complete search history.

(56) References Cited

U.S. PATENT DOCUMENTS

| | | | | |
|---|---|---|---|---|
| 6,132,010 | A * | 10/2000 | Holt | B60T 8/4045 303/11 |
| 6,138,801 | A * | 10/2000 | Shirai | B60T 13/74 188/157 |
| 6,152,545 | A * | 11/2000 | Mauser | B60T 13/74 303/20 |
| 6,545,852 | B1 | 4/2003 | Arnold | |
| 6,728,614 | B2 * | 4/2004 | Matsubara | B60T 8/885 188/158 |
| 6,854,813 | B2 * | 2/2005 | Yokoyama | B60T 8/3255 303/122.04 |
| 7,888,817 | B2 | 2/2011 | Herges et al. | |
| 8,219,289 | B2 * | 7/2012 | Kamada | B60T 1/005 192/220.2 |
| 2003/0006726 | A1 | 1/2003 | Weiberle et al. | |
| 2003/0030322 | A1 * | 2/2003 | Yokoyama | B60T 8/3255 303/122.04 |
| 2003/0233179 | A1 * | 12/2003 | Matsubara | B60T 8/885 701/36 |
| 2005/0000763 | A1 | 1/2005 | Haffelder et al. | |
| 2005/0200194 | A1 * | 9/2005 | Nilsson | B60T 8/885 303/20 |
| 2007/0222284 | A1 * | 9/2007 | Matsubara | B60T 8/885 303/122.04 |
| 2011/0098902 | A1 | 4/2011 | Heise et al. | |
| 2011/0148184 | A1 * | 6/2011 | Suzuki | B60L 3/108 303/3 |
| 2012/0130614 | A1 * | 5/2012 | Wiens | B60T 7/12 701/70 |
| 2013/0282249 | A1 * | 10/2013 | Heise | B60T 7/042 701/70 |
| 2015/0094925 | A1 * | 4/2015 | Senoo | B60T 1/005 701/70 |
| 2015/0203082 | A1 * | 7/2015 | Forster | B60T 7/08 701/70 |
| 2015/0251639 | A1 | 9/2015 | Sautter et al. | |
| 2016/0009257 | A1 * | 1/2016 | Joyce | B60T 17/221 701/70 |

FOREIGN PATENT DOCUMENTS

| | | |
|---|---|---|
| DE | 102012212090 A1 | 1/2014 |
| EP | 2934971 | 10/2015 |
| JP | 11171006 A * | 6/1999 |
| JP | 2008298016 A * | 12/2008 |
| JP | 2008298016 A | 12/2008 |

OTHER PUBLICATIONS

Machine Translation in English for DE 19758289 A1; Inventor:Skotzek et al.; 3 pages; Retreive Date: Oct. 4, 2017.*
Machine Translation in English for JP 2008-298016 A; Inventor: Nakaya; 6 pages; Retreive Date: Oct. 4, 2017.*
GB Search Report dated Jun. 16, 2017.

* cited by examiner

ELECTRIC PARKING BRAKE FOR AUTONOMOUS VEHICLES

CROSS-REFERENCE TO RELATED APPLICATIONS

This patent application claims priority to and all advantages of U.S. Patent Application No. 62/265,915, filed Dec. 10, 2015, which is hereby incorporated by reference in its entirety.

BACKGROUND

Autonomous vehicles are expected to include two sources of electrical power for actuating service brakes and parking brakes with one of the power sources providing back-up power for the other.

DETAILED DESCRIPTION

Introduction

The incorporation of a back-up power source is challenging to implement in electrically-actuated brake architectures where the parking brake system employs the principal or service brake actuation system. A further challenge is presented by a preferences to use existing brake components and control systems. It is desirable, given the volume of existing brake systems available for non-autonomous vehicles, to leverage the design and the associated economies of scale of such systems to provide hardware components and software for an autonomous vehicle brake system.

An example system addressing these concerns includes a vehicle parking brake system having a power bridge. The power bridge is electrically connected to a primary power source and to a secondary power source. The power bridge has a first condition in which the primary power source is active in which the primary power source is electrically connected to a parking brake actuator. The power bridge has a second condition in which the primary power source is not active in which the secondary power source is electrically connected to the parking brake.

Relative orientations and directions (by way of example, upper, lower, bottom, rearward, front, rear, back, outboard, inboard, inward, outward, left, right) are set forth in this description not as limitations, but for the convenience of the reader in picturing at least one embodiment of the structures described.

Exemplary System Elements

Figure 1:
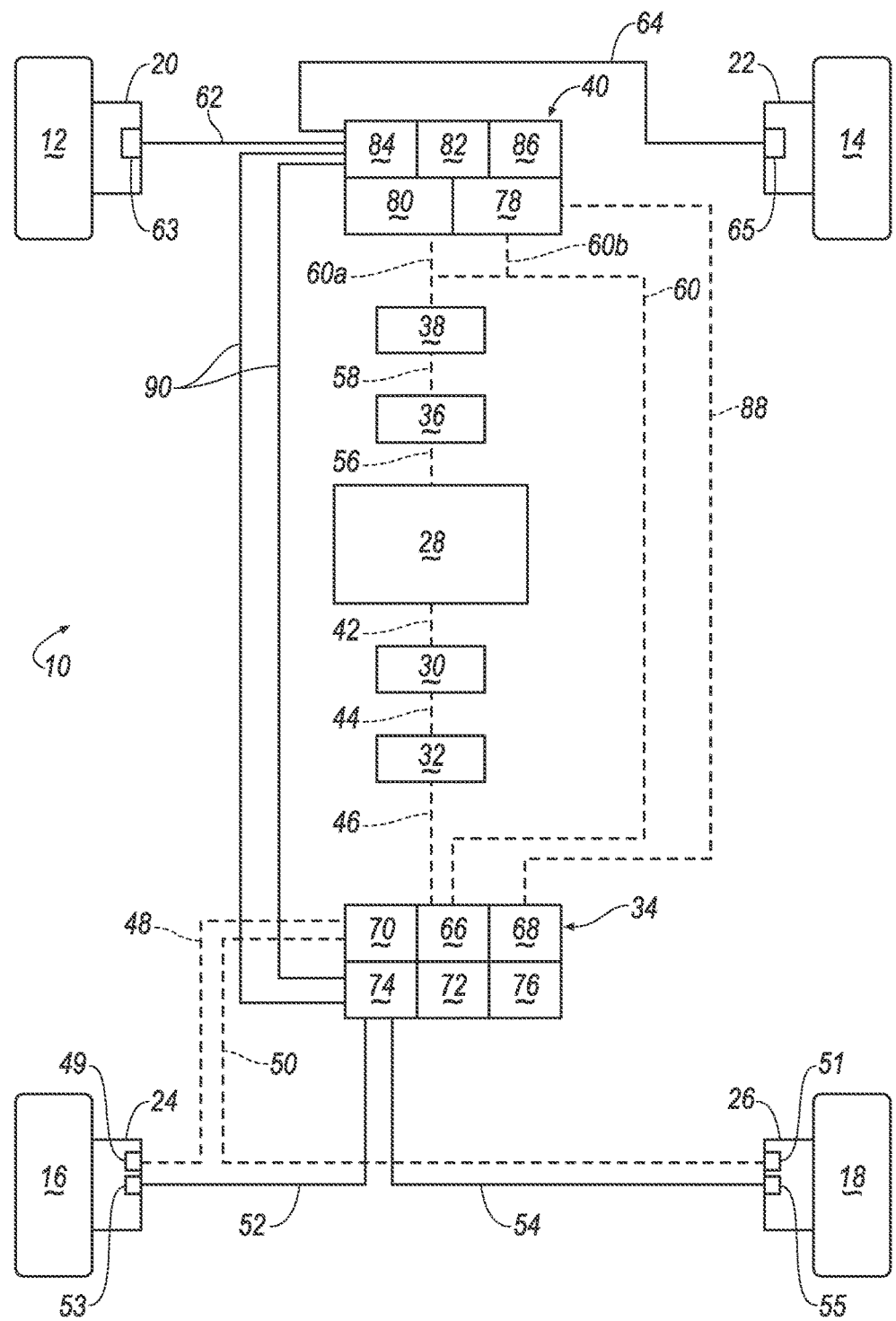
FIG. 1 is a schematic view of an exemplary vehicle brake system.

FIG. 1 illustrates a schematic diagram of an exemplary vehicle brake system 10. Vehicle brake system 10 includes brake mechanisms that act to reduce rotational velocity of vehicle wheels, specifically a left front wheel 12, a right front wheel 14, a left rear wheel 16 and a right rear wheel 18. Wheels 12, 14, 16 and 18 each have an associated brake, correspondingly a left front brake 20, a right front brake 22, a left rear brake 24 and a right rear brake 26.

Brake system 10 as illustrated features a component arrangement suited for hybrid electric vehicles and all-electric vehicles. Power for operating exemplary brake system 10, when brake system 10 is fully operational, is ultimately provided by a high voltage battery 28. The exemplary high voltage battery 28 is rated at 300 volts direct current (300V DC). A primary power converter 30 is connected to an output of battery 28. Exemplary converter 30 reduces the voltage level to approximately 12V DC. The voltage is communicated to a primary low voltage battery 32. Exemplary low voltage battery 32 is rated as a 12V DC battery. Battery 32 and converter 30 may be collectively characterized as a primary power source. Power is communicated from low voltage battery 32 to a primary braking module 34. A secondary power converter 36 is connected to the output of high voltage battery 28. Exemplary converter 36 reduces the voltage level to approximately 12V DC. The voltage is communicated to a secondary low voltage battery 38. Exemplary low voltage battery 38 is rated as a 12V DC battery. Consistent with the present examples, each of the primary and secondary power sources include a power storage device. For some applications, an alternative to one or both of batteries 32 and 38 could include another power storage device, such as a capacitor. Power is communicated from low voltage battery 38 to a secondary braking module 40. Alternatively, brake system 10 could be configured without high voltage battery 28 and without converters 30 and 36. Such an arrangement would be better suited to use with a vehicle relying on an internal combustion engine for substantially all of its propulsion power. The primary and secondary power sources in such a configuration would require only low voltage batteries 32 and 38.

A first high-voltage-output electrical line 42 electrically connects battery 28 and converter 30 for power transmission therebetween. A first converter-output electrical line 44 electrically connects primary power converter 30 and primary low voltage battery 32 for power transmission therebetween. A first low-voltage-output electrical line 46 electrically connects battery 32 and primary braking module 34 for power transmission therebetween. A braking-module-to-left-rear-brake electrical line 48 electrically connects module 34 with an electromechanical parking brake actuator 49 of brake 24. A braking-module-to-right-rear-brake electrical line 50 electrically connects module 34 with an electromechanical parking brake actuator 51 of brake 26. The combination of actuator 49 and brake 24 may be characterized as a left rear parking brake, the combination of actuator 51 and brake 26 may be characterized as a right rear parking brake, and the combination of the left and right parking brakes characterized more simply as a parking brake. A braking-module-to-left-rear-brake pressure transfer or hydraulic line 52 hydraulically connects module 34 with a hydraulic service brake actuator 53 of brake 24. A braking-module-to-right-rear brake hydraulic line 54 hydraulically connects module 34 with a hydraulic service brake actuator 55 of brake 26. A combination of brakes 24 and 26 and hydraulic actuators may be characterized as rear service brakes, and together with brakes 20 and 22 more generally characterized as service brakes.

A second high-voltage-output electrical line 56 electrically connects battery 28 and converter 36 for power transmission therebetween. A second converter-output electrical line 58 electrically connects secondary power converter 36 and secondary low voltage battery 38 for power transmission therebetween. A second low-voltage-output electrical line 60 electrically connects battery 38 and secondary braking module 40 for power transmission therebetween. A braking-module-to-left-front-brake hydraulic line 62 hydraulically connects module 40 with a hydraulic service brake actuator 63 of brake 20. A braking-module-to-rightfront brake hydraulic line 64 hydraulically connects module 40 with a hydraulic service brake actuator 65 of brake 22.

Exemplary primary braking module 34 includes a power bridge 66, a primary brake electronic control unit ("ECU") 68, a primary brake power electronics unit 70, a primary pump motor 72 drivingly connected to a primary pump (not shown), a primary brake hydraulic valve block 74 and a primary brake fluid reservoir 76, with the pump receiving hydraulic fluid from reservoir 76 and supplying it to valve block 74. ECU 68 and power electronics unit 70 may be collectively characterized as a primary electronics unit. The primary pump, motor 72, valve block 74 and reservoir 76 can be collectively characterized as a primary hydraulic brake actuation module. Exemplary hydraulic lines 52 and 54 connect, on a primary braking module end, to primary brake hydraulic valve block 74. Valve block 74 is electrically connected to ECU 68 and responds to commands therefrom. The exemplary elements 66, 68, 70, 72, 74, 76 of module 34 are illustrated as integrated into a single component. However, elements 66, 68, 70, 72, 74, 76 of module 34 may be provided as discrete stand-alone features, or associated in alternative combinations.

Exemplary lines 48 and 50 connect to the primary brake power electronics unit 70. Electromechanical parking brake actuators 49 and 51 include known electronic brake actuation mechanisms responsive to the supply of 12V DC power to both engage and disengage the brakes. One exemplary actuation mechanism is driven by a worm-gear arrangement resistant to back driving. Resistance to back driving allows the brakes 24 and 26 to maintain the parking brake load when no electrical power is supplied to brakes 24 and 26. An alternative structure for a parking brake may include a drum and shoe combination as a supplement to a service brake caliper and pad combination.

Exemplary low voltage electrical lines 46 and 60 from primary low voltage battery 32 and secondary low voltage battery 38 connect to power bridge 66. Power bridge 66 enables the use of secondary battery 38 and converter 30 as a back up power source to primary battery 32 and converter 30. Exemplary power bridge 66 includes a first terminal electrically connected to primary low voltage battery 32 and a second terminal connected to secondary low voltage battery 38. Exemplary power bridge 66 further includes electrical circuits that, in a first condition in which primary battery 32 provides sufficient power, communicate electrical power from primary battery 32 to each of ECU 68 and power electronics unit 70. When power is available from the primary power source, primary module 34 is able to operate the service brakes, the parking brake, and a transmission park pawl (not shown) which operates in a well known manner. The circuits of power bridge 66, in a second condition in which primary battery 32 does not provide sufficient power to operate the service brake actuators 63, 65, communicates electrical power from secondary battery 38 to each of ECU 68 and power electronics unit 70. Bridge 66 allows primary brake module 34 to operate off of battery 32 as long as it is available. Such bridge circuits are known in the art, and need not be described in additional detail here. Secondary battery 38 and converter 36 are not sized to serve simultaneously as a power source for both brake modules 34 and 40. When secondary battery 38 and converter 36 are providing power to both brake modules 34 and 40, primary ECU 68, in accord with the logic described later in this description, operates brake module 34 in a fallback performance mode. In an exemplary fallback mode, bridge 66 allows primary brake module 34 to operate its ECU 68 and the electric parking brake off of battery 38 and 32 if the primary power source is not available. The front service brakes 20 and 22 continue to operate in the fallback mode in the event of a loss of the availability of the primary power source. The ability to set the parking brake is maintained with a failure of either the first or second power source, so long as the other power source remains available.

Exemplary secondary braking module 40 includes a secondary brake ECU 78, a secondary brake power electronics unit 80, a secondary pump motor 82 drivingly connected to a secondary pump (not shown), a secondary brake hydraulic valve block 84 and a secondary brake fluid reservoir 86, with the pump receiving hydraulic fluid from reservoir 86 and supplying it to valve block 84. The secondary pump, motor 82, valve block 84 and reservoir 86 can be collectively characterized as a secondary hydraulic brake actuation module. ECU 78 and power electronics unit 80 may be collectively characterized as a secondary electronics unit. Exemplary hydraulic lines 62 and 64 connect, on a secondary braking module end, to secondary brake hydraulic valve block 84. Valve block 84 is electrically connected to ECU 78 and responds to commands therefrom. Secondary power electronics unit 80 and secondary brake ECU 78 are respectively connected separately to electrical line 60 via a power feed line 60A and a controller feed line 60 B. The separate lines 60A and 60B enable the provision of clean power to ECU 78, the clean power being substantially unaffected by power variations attributable to motor 72 and power electronics unit 70. Alternatively, such splitting of the power supplied by line 60 could be performed within braking module 40. The exemplary elements 78, 80, 82, 84, 86 of module 40 are integrated into a single component. However, elements 78, 80, 82, 84, 86 of module 40 could be provided as discrete stand-alone features, or associated in alternative combinations. A power bridge module may be added to braking module 40 if it is desired to use primary battery 32 as a back-up to secondary battery 38.

An exemplary communications electrical line 88 electrically connects primary ECU 68 and secondary ECU 78, enabling communication therebetween. Electrical line 88 can comprise part of a vehicle controller area network ("CAN") bus. Wireless communication can provide a connection between primary ECU 68 and secondary ECU 78. Other components and sensors communicate with ECUs 68 and 78 via the CAN bus. Exemplary pressure transfer lines 90 fluidly connect valve blocks 74 and 84 to enable communication of fluid therebetween in the event of an inability of either of modules 34 and 40 to provide pressurized fluid to its respective wheel brakes.

Brake system 10 is electrically connected to, and/or may be understood as including, electronic control units 68 and 78, each of which may be alternatively characterized as a controller or a computer. Electronic control units 68 and 78 are electrically connected to the wheel brakes, and to sensors (not shown) which can include, by way of example, wheel speed sensors at wheels 12, 14, 16, 18 indicating changes in vehicle speed as may be indicative of a parking event or state, and fluid pressure sensors which are indicative of braking loads at the wheels. The sensors provide electrical signals to electronic control units 68 and 78 indicative of their respective parameters. Such electronic connections may be made either with wire, or without wire using wireless communications technology.

The electronic control units 68, 78 include at least one electronic processor and associated memory. The processor's operating system software is stored in memory for access by the processor. Also, control software for executing certain predetermined tasks is maintained in memory. The memory also includes a buffer region, or more simply a buffer, facilitating the storage and manipulation of data. The precise structure of electronic control units 68, 78 is not critical to the present description and is within the knowledge of those skilled in the art. Electronic control units 68, 78 are programmed by control software to cause braking system 10 to engage the brakes when the vehicle is in a Park condition. In an exemplary embodiment, the parking brake is actuated by the primary power source 32 and converter 30 when both power primary and secondary sources are active, and the parking brake is actuated by the secondary power source when the primary power source is not active.

Processing

Figure 2:
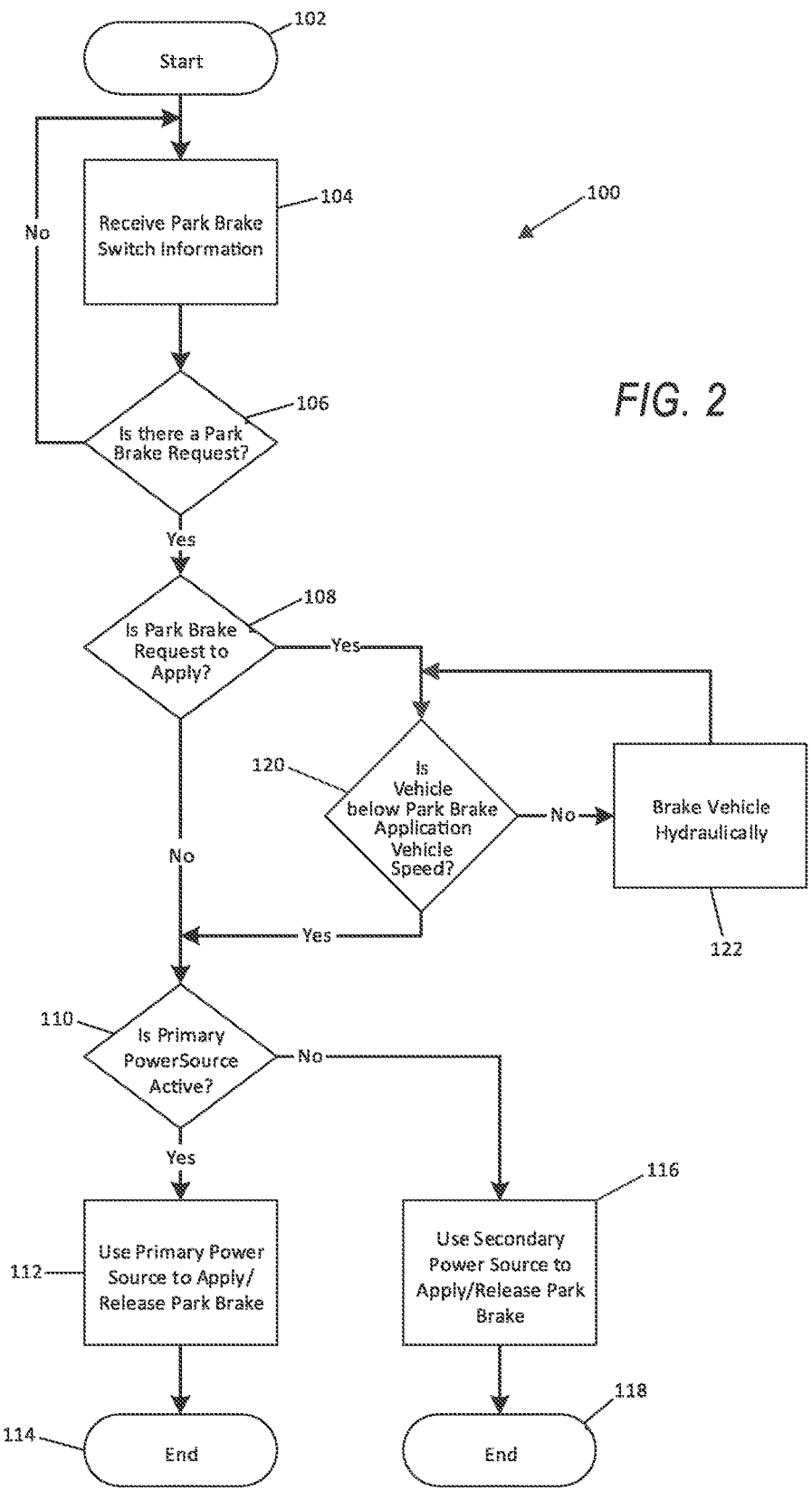
FIG. 2 is a flow chart of exemplary logic for the parking brake control system of FIG. 1.

Controllers 68 and 78 may include the exemplary logic of FIG. 2 that illustrates steps for applying the parking brake. An exemplary process 100 is initiated with start block 102. In process block 104, data relevant to the condition of a parking brake switch or switches (not shown), in turn relevant to whether a parking brake request ("Parking Brake Request") has been made, and whether there has been an occurrence of a parking brake request to apply ("Parking Brake Request to Apply") is received. The two are distinguished in that a Parking Brake Request may be either a request to apply the parking brake or a request to release the parking brake, while a Parking Brake Request to Apply will include only requests to apply the parking brake. The parking brake switch data may include a park ready signal from a separate controller or process programmed to evaluate multiple factors including vehicle location and occupant presence and may provide an affirmative or a negative switch signal. Data may also include a condition of an operator controlled switch (not shown) for indicating election of a vehicle Park mode. In decision block 106, a determination is made, based on the data provided, as to whether a Parking Brake Request has been made. When it is determined that a Parking Brake Request has not been made, the process loops back to process block 104 to gather more recent data. When it is determined that a Parking Brake Request has been made, the process moves to decision block 108 which determines whether a Parking Brake Request to Apply condition has been set or exists.

When it is determined that a Parking Brake Request to Apply condition does not exist, as when a request to release the parking brake has been detected, the process moves to decision block 110 which determines whether the primary power source, battery 32 and converter 30 in the present exemplary system, is active. Active means at least the primary power source components and their interfaces are not exhibiting any identified faults and the primary power source is capable of providing sufficient power to operate the hydraulic brake actuation system including the pump motors 72 and 82 and the parking brake actuators 49, 51. As battery 32 is connected to ECU 68 through bridge 66, such an assessment may be made by ECU 68. Checks may be made on the functionality of converter 30, and a functionality of certain interfaces. The interfaces may include an interface between brake module 34 and each of the primary and secondary power sources. The interfaces may also include high voltage battery to converter 30, 36 interfaces and converter 30, 36 to battery 32, 38 interfaces. A check for power faults can additionally be made at vehicle system initialization and vehicle system shutdown, and used in an assessment of whether entry into an autonomous mode of vehicle operation should be permitted. If the primary power source 32 and 30 is determined to be active, the process moves to process block 112 and the primary power source 32 and 30 is used to either release or apply parking brake actuators 49, 51. In the present example, with a Park Brake Request being detected, and a Park Brake Request to Apply not being detected, the parking brakes, and more particularly actuators 49, 51 will be released. The process terminates at end block 114. If it is determined by decision block 110 that primary source 32 and 30 is not active, then process 100 moves to process block 116 and secondary power source 38 and 36 is used to energize parking brake actuators 49 and 51 to release brakes 24 and 26 in the parking brake fallback mode of operation. The process then terminates at end block 118.

When it is determined that a Parking Brake Request to Apply condition does exist, process 100 moves to decision block 120. Decision block 120 determines whether the vehicle is below a Park Brake Application Vehicle Speed, as an exemplary indicator of whether the vehicle is in a park-ready condition. An exemplary speed may be zero miles per hour. When it is determined that the vehicle is at or above the Park Brake Application Vehicle Speed (an absolute value), process 100 moves to process block 122 which directs the application of the hydraulic brakes to slow the vehicle. The process then cycles back to decision block 120 to determine if the Vehicle has been sufficiently slowed. When decision block 120 determines that the vehicle speed has been reduced to the Park Brake Application Vehicle Speed or less, process 100 moves to decision block 110. Processing by decision block 110 is consistent with the description set forth above, except that the parking brake would be engage instead of released by the primary power source when the primary power source is active, and engaged through the use of secondary power source when the primary power source is not active.

The loss or failure of the primary power source would not take down the processing capability of the primary braking module 34, the wheel speed sensors and the electric parking brake controls. If both primary and secondary power are available, then the primary brake ECU 68 is capable of full functionality. If primary power is not available, a reduced hydraulic functionality may be allowed but substantial electric parking brake function remains available. The disclosed design allows the vehicle to hold itself at standstill for an indefinite period of time with a failure of the primary power system. This also allows for one module 34, and particularly one ECU 68, to control the electric parking brake without complex software, parking brake power controls and arbitration associated with a hand-off of control to a secondary or back-up ECU. The use of the electric parking brake mechanism potentially avoids the need to shift the vehicle transmission to Park for the purpose of deploying the park pawl after primary power has been lost, eliminating the need to provide hardware and power to execute such a transmission shift.

CONCLUSION

As used herein, the adverb "substantially" means that a shape, structure, measurement, quantity, calculation, time, etc. may deviate from an exact described geometry, distance, measurement, quantity, calculation, time, etc., because of imperfections in materials, machining, manufacturing, sensor measurements, computations, processing time, communications time, etc.

As used in herein, "parking brake" is interchangeable with "park brake."

With regard to the references to computers in the present description, computing devices such as the ECU discussed herein generally each include instructions executable by one or more computing devices such as those identified above, and for carrying out process blocks or steps of processes described above. For example, process blocks as discussed above are embodied as computer executable instructions.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the processes, systems, methods, etc. described herein, it should be understood that, although the steps of such processes, etc. relating to the deployment and use of electric vehicles have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

Accordingly, it is to be understood that the above description is intended to be illustrative and not restrictive. Many embodiments and applications other than the examples provided would be apparent to those of skill in the art upon reading the above description. Some alternative embodiments are described above in the context of the description. Other alternative embodiments may include, by way of example, incorporating parking brakes into the front brakes instead of or in addition to the rear brakes. Yet alternatively, the service brakes could be provided by electromechanical actuators instead of electrohydraulic actuators. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation and is limited only by the following claims.

The invention claimed is:

1. A brake system comprising:
   a primary brake electronic control unit electrically connected to a primary power source;
   a secondary brake electronic control unit electrically connected to a secondary power source;
   a primary brake hydraulic valve block electrically connected with the primary brake electronic control unit, the primary brake hydraulic valve block connected with two primary service brakes by a hydraulic line for each primary service brake;
   a secondary brake hydraulic valve block electrically connected with the secondary brake electronic control unit, the secondary brake hydraulic valve block connected with two secondary service brakes by a hydraulic line for each secondary service brake; and
   the primary brake hydraulic valve block connected with the secondary brake hydraulic valve block by two hydraulic lines associated with the secondary service brakes; and
   a power bridge electrically connected to the primary brake electronic control unit, to the secondary brake electronic control unit, to the primary power source and to the secondary power source, the power bridge having:
      a first condition in which the primary power source is active in which the primary power source is electrically connected to the primary brake electronic control unit;
      a second condition in which the primary power source is not active in which the secondary power source is electrically connected to the primary brake electronic control unit; and
   the brake system further comprising a parking brake actuator connected to the power bridge, and wherein the primary power source is electrically connected to the parking brake actuator when the power bridge is in the first condition, and the secondary power source is electrically connected to the parking brake actuator when the power bridge is in the second condition.

2. The brake system of claim 1, wherein the power sources are each batteries.

3. The brake system of claim 1, wherein the parking brake actuator is an electromechanical actuator.

4. The brake system of claim 1, further comprising:
   a means for determining whether a parking brake request to apply has been received; and
   a means for applying a parking brake with the connected power source when it is determined that a parking brake request to apply has been received.

5. The brake system of claim 4, further comprising:
   a means for determining whether a vehicle is operating at a speed below a parking brake application vehicle speed; and
   a means for automatically slowing the vehicle when a parking brake request to apply has been received and the vehicle is not operating at a speed below the parking brake application vehicle speed.

6. The brake system of claim 4, further comprising:
a means for determining whether a parking brake request has been received; and
a means for releasing the parking brake with the connected power source when it is determined that a parking brake request has been received and it is also determined that a parking brake request to apply has not been received.

7. The brake system of claim 6, further comprising:
a means for predetermining whether a parking brake request has been received when it is determined that a parking brake request has not been received.

8. A vehicle parking brake system comprising:
a power bridge electrically connected to a primary power source and to a secondary power source and having:
 a first condition in which the primary power source is active in which the primary power source is electrically connected to a parking brake actuator, and
 a second condition in which the primary power source is not active in which the secondary power source is electrically connected to the parking brake actuator;
a primary brake hydraulic valve block electrically connected with a primary brake electronic control unit; and
a secondary brake hydraulic valve block electrically connected with a secondary brake electronic control unit;
wherein:
 the secondary brake hydraulic valve block connected with two secondary service brakes by a hydraulic line for each secondary service brake;
 the primary brake hydraulic valve block connected with two primary service brakes by a hydraulic line for each primary service brake; and
 the primary brake hydraulic valve block connected with the secondary brake hydraulic valve block by two hydraulic lines associated with the secondary service brakes.

9. The brake system of claim 8, wherein:
the primary brake electronic control unit is electrically connected to the power bridge and electrically connected to the primary power source and selectively electrically connected to the secondary power source, and
the secondary brake electronic control unit is electrically connected to the power bridge and electrically connected to the secondary power source.

10. The brake system of claim 8, further comprising:
a means for determining whether a parking brake request to apply has been received; and
a means for applying a parking brake with the connected power source when it is determined that a parking brake request to apply has been received.

11. The brake system of claim 10, further comprising:
a means for determining whether a vehicle is operating at a speed below a parking brake application vehicle speed; and
a means for automatically slowing the vehicle when a parking brake request to apply has been received and the vehicle is not operating at a speed below the parking brake application vehicle speed.

12. The brake system of claim 8, further comprising a high voltage battery, and wherein the primary power source includes a primary low voltage battery and a primary power converter disposed between the high voltage battery and the primary low voltage battery, and the secondary power source includes a secondary low voltage battery and a secondary power converter disposed between the high voltage battery and the secondary low voltage battery.

13. A brake system for a vehicle comprising:
a primary power source;
a secondary power source;
a primary electronics unit;
a primary hydraulic brake actuation module electrically connected to the primary electronics unit, the primary hydraulic brake actuation module connected with two primary service brakes by a hydraulic line for each primary service brake;
a secondary electronics unit electrically connected to the secondary power source;
a power bridge connected to the primary power source, the secondary power source, and the primary electronics unit;
a secondary hydraulic brake actuation module electrically connected to the secondary electronics unit, the secondary hydraulic brake actuation module connected with two secondary service brakes by a hydraulic line for each secondary service brake; and
the primary hydraulic brake actuation module connected with the secondary hydraulic brake actuation module by two hydraulic lines associated with the secondary service brakes;
wherein the power bridge has a first condition characterized by the primary power source being active in which the primary power source is electrically connected to the primary electronics unit, and a second condition characterized by the primary power source being inactive in which the secondary power source is electrically connected to the primary electronics unit; wherein in the first condition an electric parking brake is applied by the primary power source and in the second condition the electric parking brake is applied by the secondary power source.

14. The brake system of claim 13, wherein the power sources are each batteries.

15. The brake system of claim 13, further comprising:
a primary brake electronic control unit electrically connected to the power bridge and electrically connected to the primary power source and selectively electrically connected to the secondary power source, and
a secondary brake electronic control unit electrically connected to the power bridge and electrically connected to the secondary power source.

16. The brake system of claim 15, wherein:
the primary hydraulic brake actuation module is electrically connected with the primary brake electronic control unit; and
the secondary hydraulic brake actuation module is electrically connected with secondary brake electronic control unit.

17. The brake system of claim 13, further comprising a high voltage battery wherein:
the primary power source includes a primary low voltage battery and a primary power converter disposed between the high voltage battery and the primary low voltage battery; and
the secondary power source includes a secondary low voltage battery and a secondary power converter disposed between the high voltage battery and the secondary low voltage battery.

* * * * *

UNITED STATES PATENT AND TRADEMARK OFFICE
CERTIFICATE OF CORRECTION

PATENT NO. : 10,549,731 B2
APPLICATION NO. : 15/210739
DATED : February 4, 2020
INVENTOR(S) : Scott J. Lauffer et al.

Page 1 of 1

It is certified that error appears in the above-identified patent and that said Letters Patent is hereby corrected as shown below:

In the Claims

Column 9, Line 12, Claim 7:     delete "predetermining" and replace with --redetermining--.

Signed and Sealed this
Twenty-eighth Day of April, 2020

Andrei Iancu
*Director of the United States Patent and Trademark Office*